United States Patent
Luo et al.

(10) Patent No.: US 12,420,414 B2
(45) Date of Patent: Sep. 23, 2025

(54) ROBOT CONTROL METHOD BASED ON TRAJECTORY OF CENTER OF MASS, ROBOT AND COMPUTER-READABLE STORAGE MEDIUM

(71) Applicant: UBTECH ROBOTICS CORP LTD, Shenzhen (CN)

(72) Inventors: Qiuyue Luo, Shenzhen (CN); Ligang Ge, Shenzhen (CN); Chunyu Chen, Shenzhen (CN); Xuan Luo, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 213 days.

(21) Appl. No.: 18/218,604

(22) Filed: Jul. 6, 2023

(65) Prior Publication Data

US 2024/0009842 A1   Jan. 11, 2024

(30) Foreign Application Priority Data

Jul. 8, 2022   (CN) .......................... 202210806844.X (51) Int. Cl.
*B25J 9/16* (2006.01)

(52) U.S. Cl.
CPC .................. *B25J 9/1664* (2013.01)

(58) Field of Classification Search
CPC ...... B25J 9/1664; B25J 9/0006; B25J 9/1628; B25J 9/1653; B25J 9/1656; B62D 57/032; G05D 2109/12; G05B 2219/35124
See application file for complete search history.

(56) References Cited

U.S. PATENT DOCUMENTS

| | | | |
|---|---|---|---|
| 9,586,316 B1 * | 3/2017 | Swilling | B25J 9/1664 |
| 2011/0301756 A1 * | 12/2011 | Yoshiike | B62D 57/032 901/1 |
| 2018/0004208 A1 * | 1/2018 | Su | G05D 1/021 |
| 2019/0070729 A1 * | 3/2019 | Kamioka | B62D 57/032 |
| 2019/0118384 A1 * | 4/2019 | Dalibard | B25J 19/0008 |

FOREIGN PATENT DOCUMENTS

| | | |
|---|---|---|
| CN | 110764416 A | 2/2020 |
| CN | 114137954 A | 3/2022 |

* cited by examiner

*Primary Examiner* — Sze-Hon Kong
*Assistant Examiner* — Esvinder Singh (57) ABSTRACT

A method for controlling a robot based on a trajectory of a center of mass (COM) of the robot includes: calculate a desired periodic trajectory of the robot in a single gait cycle based on a dynamic equation constructed according to a simplified model of the robot; correct the desired periodic trajectory according to a fed-back state of the COM of the robot; generate a desired trajectory of the COM of the robot using the corrected desired periodic trajectory; and control motion of the robot according to the desired trajectory of the COM of the robot.

20 Claims, 9 Drawing Sheets

ROBOT CONTROL METHOD BASED ON TRAJECTORY OF CENTER OF MASS, ROBOT AND COMPUTER-READABLE STORAGE MEDIUM

CROSS REFERENCE TO RELATED APPLICATIONS

This application claims priority to Chinese Patent Application No. 202210806844.X, filed Jul. 8, 2022, which is hereby incorporated by reference herein as if set forth in its entirety.

TECHNICAL FIELD

The present disclosure generally relates to robots, and particularly to a robot control method based on the trajectory of the center of mass of a biped robot, biped robot and computer-readable storage medium.

BACKGROUND

During the walking process of a biped humanoid robot, the trajectory of the center of mass is a very important factor affecting the stability of walking. In some conventional approaches for controlling a biped humanoid robot, complex motion equations or curves are usually constructed according to task requirements to pre-plan the trajectory of the center of mass of the robot when the robot is walking. When tasks need to be modified, the trajectory of the center of mass must be re-planned, and the re-planning process is often complicated and time-consuming.

Therefore, there is a need to provide a robot control method to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 1:
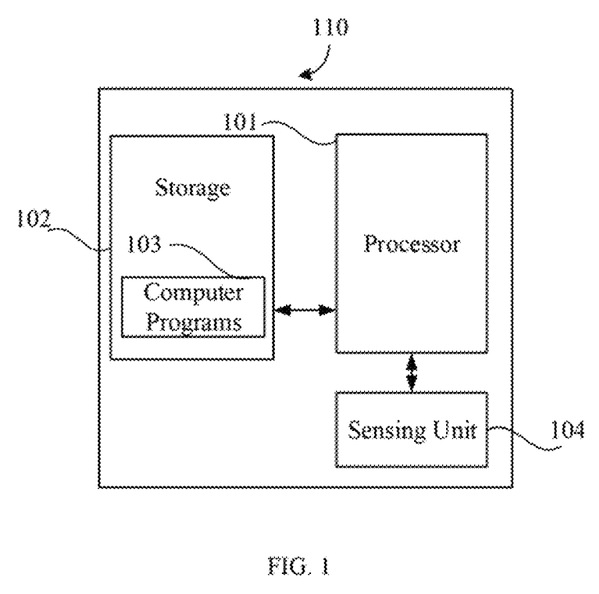
FIG. 1 is a schematic block diagram of a biped robot according to one embodiment.
Figure 8:
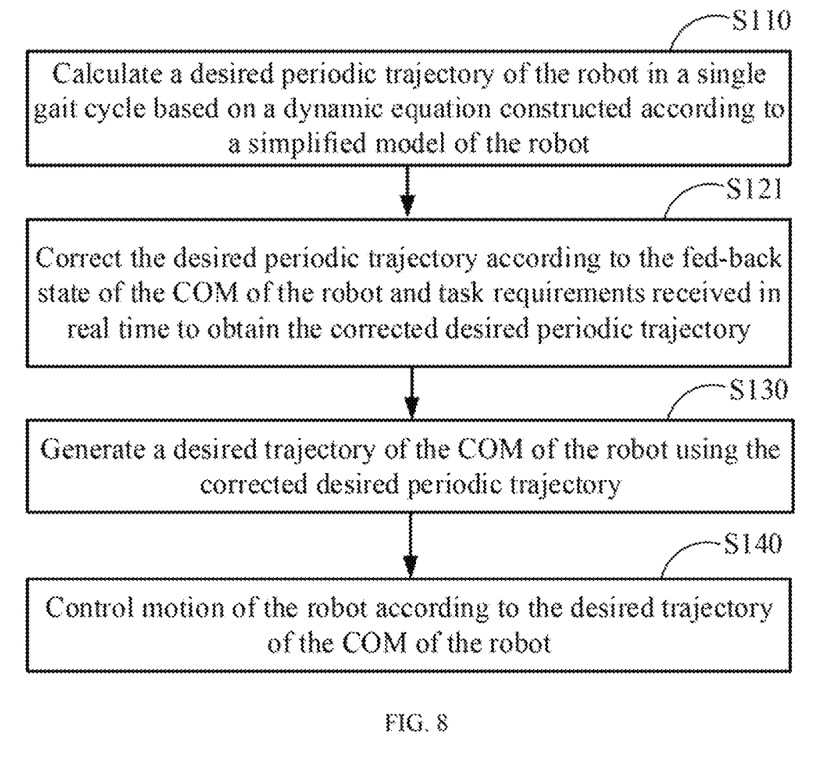
FIG. 8 is exemplary flowchart of a center-of-mass motion planning method according to another embodiment.

FIG. 1 shows a schematic block diagram of robot 110 according to one embodiment. The robot 110 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of the center-of-mass motion planning method, such as steps S110 to S140 in FIG. 2 and steps S210 and S230 in FIG. 5, and steps S110 to S140 in FIG. 8 are implemented. By implementing the method described in the embodiments below, it can effectively solve the problem in some conventional approaches that the trajectory of the center of mass of a walking robot needs to be planned in advance and is difficult to modify in real time.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the robot 110, such as a hard disk or a memory. The storage 102 may also be an external storage device of the robot 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the robot 110. The storage 102 can also be used to temporarily store data that have been output or is about to be output.

Figure 9:
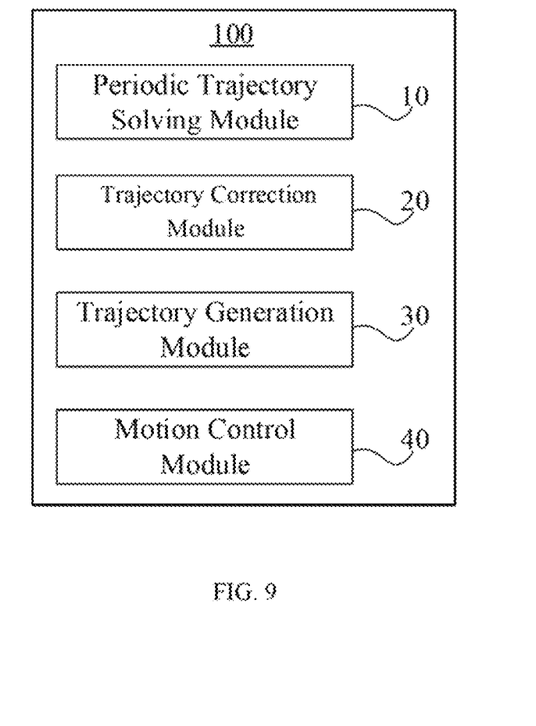
FIG. 9 is schematic block diagram of a center-of-mass motion planning device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot 110. For example, the one or more computer programs 103 may be divided into a periodic trajectory solving module 10, a trajectory correction module 20, a trajectory generation module 30, and a motion control module 40 as shown in FIG. 9.

In one embodiment, the robot 110 may further include a sensing unit 104 that is electrically connected to the processor 101. The sensing unit 104 includes a number of sensors arranged on the robot, and these sensors are to detect necessary external information and state information of the robot to the control system of the robot, so as to provide necessary inputs for the robot to make decisions. In some cases, these sensors can be divided into internal sensors and external sensors. The internal sensors are to measure the state of the robot. Their functions are to measure the kinematics and force quantities, which are used for the robot to determine its own motion state, so that the robot can move according to the specified parameters such as position, trajectory and speed. For example, in one embodiment, the position of the center of mass, the speed of the center of mass, the acceleration of the center of mass and other motion states of the robot can be obtained through feedback from these internal sensors. Exemplarily, these internal sensors include, but are not limited to, position or angle sensors, six-dimensional force sensors, pressure sensors, etc. arranged at joints or the torso of the robot. The external sensors are to detect the mutual information between the robot itself and the environment, such as vision and other information. The external sensors may include but are not limited to proximity sensors, vision sensors, and the like. It should be understood that the sensors listed above can be selectively arranged according to actual application scenarios.

It should be noted that the block diagram shown in FIG. 1 is only an example of the robot 110. The robot 110 may include more or fewer components than what is shown in FIG. 1, or have a different configuration than what is shown in FIG. 1. Each component shown in FIG. 1 may be implemented in hardware, software, or a combination thereof.

The robot 110 has two legs imitating human walking, and the two legs move alternately during walking. Like humans, the gait of biped robots is periodic. In one gait cycle, the center of mass of the robot moves from being located on the back side of the supporting foot to the front side of the supporting foot. The center of mass will gradually approach the supporting foot in the early stage of the current gait cycle in the lateral direction, and then gradually move away, thus completing the walking of a gait cycle of the biped robot. It can be understood that by planning and combining multiple individual gait cycles, the robot can complete the desired walking task.

Based on the above-mentioned robot structure, the present disclosure proposes a method for controlling a robot based on a trajectory of a center of mass (COM) of the robot. The method divides the walking process of the robot into multiple individual gait cycles, performs trajectory planning on each single gait cycle, and then combines them to obtain a desired motion trajectory of the COM of the robot thereby completing the planning of the motion trajectory of the COM. Compared with some conventional approaches that plan the trajectory of the entire route in advance, the method proposed by the present disclosure is simpler and faster. Since each gait cycle is planned separately, trajectory correction can be performed in real time according to new task requirements.

Figure 2:
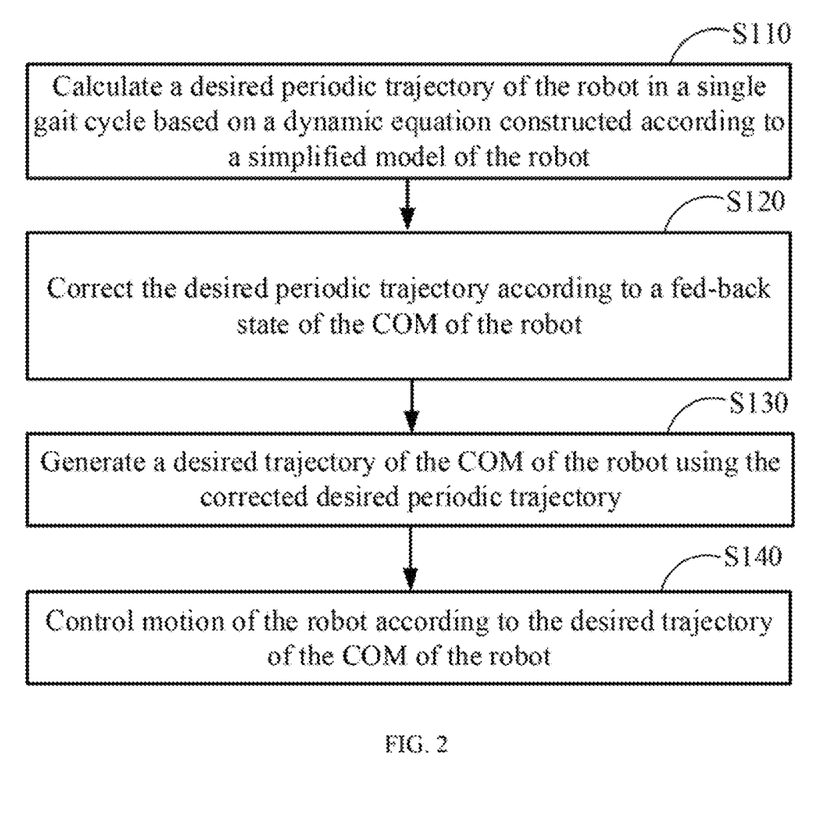
FIG. 2 is an exemplary flowchart of a center-of-mass motion planning method according to one embodiment.

FIG. 2 is an exemplary flowchart of the method controlling a robot based on a trajectory of a center of mass (COM) of the robot according to one embodiment. As an example, but not a limitation, the method can be implemented by the robot 110. The method may include the following steps.

Step S110: Calculate a desired periodic trajectory of the robot in a single gait cycle based on a dynamic equation constructed according to a simplified model of the robot.

Figure 3:
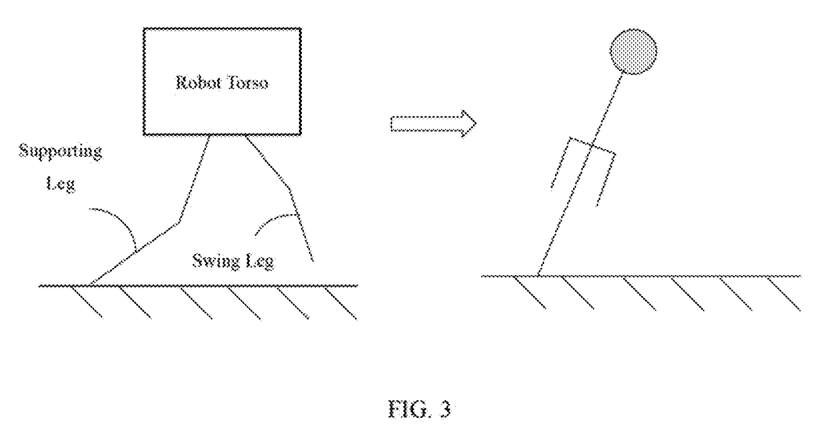
FIG. 3 is a schematic diagram of a robot simplified into a linear inverted pendulum model.

In order to facilitate the research and analysis of the motion characteristics of the robot, model simplification is performed on the robot. In one embodiment, the linear inverted pendulum model (LIPM) will be used to simplify the entire model of the biped robot. The basic principle of the linear inverted pendulum is shown in FIG. 3. The linear inverted pendulum includes a center of mass and a telescopic rod connected to the center of mass. The vertical component of the force generated by the telescopic rod can just compensate for gravity.

In one embodiment, the supporting leg(s) of the robot in the walking state are regarded as the telescopic rod, and the center of mass (trunk) of the robot is regarded as the center of mass of the linear inverted pendulum. To facilitate the description of the direction of motion, a coordinate system is established on the horizontal plane where the ankle joint of the supporting leg is located. The origin of the coordinate system is located at the ankle joint of the supporting leg, the x-axis points to the forward direction of the robot (also referred to as the forward direction), the y-axis points to the lateral direction of the robot, and the z-axis is perpendicular to and points away from the supporting surface (i.e., ground, floor, etc.) where the robot is located. It can be understood that the walking plan of the robot needs to be satisfied. The center of mass can smoothly transition from an initial position to the initial position of the next step, and the pressure center point of the supporting leg can be kept within the supporting polygon during this transition, so as to ensure the stability of walking of the robot. The pressure center point is also referred to as the zero moment point (ZMP), and here it is assumed that the position of the ZMP of the robot is [0, 0]. After setting the step length, step width and walking cycle for the robot, the characteristics of the linear inverted pendulum can be used to plan the trajectory of center of mass of the robot.

Exemplarily, the dynamic equation of the robot, which is also called the dynamic equation of the linear inverted pendulum, can be obtained by simplifying the robot to LIPM and making the zero moment point (ZMP) of the robot consistent with the support point of the linear inverted pendulum. Specifically, the dynamic equation of the linear inverted pendulum is as follows: $\ddot{x}=\omega^2 x$, $\ddot{y}=\omega^2 y$, where $\omega=\sqrt{g/z}$, $x$ and $\ddot{x}$ are respectively the position of the COM and the acceleration of the COM of the linear inverted pendulum model in the forward direction, $y$ and $\ddot{y}$ are respectively the position of the COM and the acceleration of the COM of the linear inverted pendulum model in the lateral direction, $z$ is the height of the COM of the linear inverted pendulum model from the supporting surface, and $g$ is the acceleration of gravity.

Figure 4:
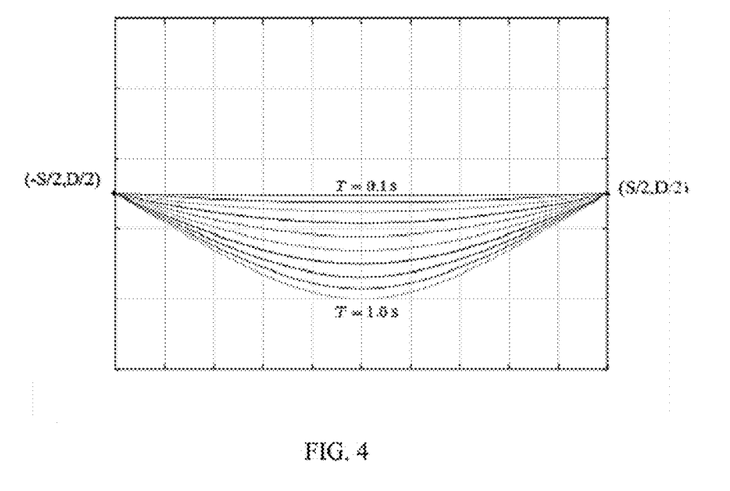
FIG. 4 is a schematic diagram of the desired periodic trajectory of a single gait of a robot based on the linear inverted pendulum model.

Then, according to the desired walking cycle and the desired height of the COM, the desired periodic trajectory of the robot in a single gait cycle can be calculated through the dynamic equation. It can be understood that when the set walking cycle is larger, the trajectory of the COM of the linear inverted pendulum will have a larger amplitude, but the COM of the linear inverted pendulum will always pass through the point (S/2, D/2), as shown in FIG. 4.

In one embodiment, when the height z of the COM is constant, the above-mentioned dynamic equation is solved to obtain the desired periodic trajectory of the robot in a single gait cycle as follows:

$$x(t) = -\frac{S}{2}\cosh(\omega t) + \frac{\dot{x}_0}{\omega}\sinh(\omega t), \quad y(t) = \frac{D}{2}\cosh(\omega t) + \frac{\dot{y}_0}{\omega}\sinh(\omega t),$$

where x(t) and y(t) represent the desired periodic trajectories of the robot along the forward direction and lateral direction at moment t, respectively, cos h( ) and sin h( ) represent hyperbolic cosine and sine, respectively, S and D represent the step length and the step width of the robot, $\dot{x}_0$ and $\dot{y}_0$ represent speeds of the COM of the robot in the forward direction and the lateral direction at a starting moment of one gait cycle, respectively.

After finding the first derivatives of the above-mentioned desired periodic trajectories, the following equations can be obtained: $\dot{x}(t) = \omega x_0 \sin h(\omega t) + \dot{x}_0 \cos h(\omega t)$, $\dot{y}(t) = \omega y_0 \sin h(\omega t) + \dot{y}_0 \cos h(\omega t)$, where $\dot{x}(t)$ and $\dot{y}(t)$ are the speeds of the robot in the forward direction and lateral direction, respectively, $x_0$ and $y_0$ are the positions of the COM along the forward direction and the lateral direction at the starting moment of a gait cycle, respectively.

In one embodiment, for periodic trajectories, under ideal conditions without interference, it is desired that at the ending moment of a gait period T, the magnitude and direction of the speed of the COM along the forward direction (corresponding to the x-axis direction) are the same as those of the COM along the forward direction at the starting moment, and the magnitude and direction of the speed along the lateral direction (corresponding to the y-axis direction) are opposite to those of the COM along the lateral direction at the starting moment. That is, the magnitude and direction of the speed of the COM along the forward direction and lateral direction satisfy the following constraints: $\dot{x}(0) = \dot{x}(T)$, $\dot{y}(0) = -\dot{y}(T)$.

The following equations can be obtained based on the calculated desired periodic trajectory and the constraints above: $\dot{x}_0^* = \omega S(1+\cos h(\omega T))/(2 \sin h(\omega T))$, $\dot{y}_0^* = \omega D(1-\cos h(\omega T))/(2 \sin h(\omega T))$, where $\dot{x}_0^*$ and $\dot{y}_0^*$ are the initial values of the speeds of a reference periodic trajectory. That is, in the absence of interference, the robot will use [−S/2, D/2, $\dot{x}_0^*$; $\dot{y}_0^*$] as the initial values of the position and speed of the COM, and take the desired cycle trajectory in a single gait cycle solved above as the ideal trajectory planning of the COM.

However, in actual situations, due to the existence of various interference factors such as model errors, friction coefficients, structural gaps, and external forces, the robot cannot guarantee that the step length and step width meet the set S and D at the ending moment of each gait cycle, and the forward and lateral positions of the COM cannot be exactly S/2 and D/2. Therefore, it needs to consider the trajectory planning of the COM when there is interference.

Exemplarily, during the walking process, the robot will control the joints of the robot to rotate according to the trajectory of the COM calculated in real time in a gait cycle. Then the actual motion state of the robot is collected and used to determine whether the robot still walks according to the desired trajectory. In the embodiment, on the basis of the calculated desired periodic trajectory in each gait cycle, the actual state of the COM of the previous step will be used to compensate, so as to achieve the purpose of correcting the desired trajectory of the COM calculated in the current step.

Step S120: Correct the desired periodic trajectory according to a fed-back state of the COM of the robot.

In one embodiment, the state of the COM of the robot includes one or more of the position, speed and acceleration of the COM. The above-mentioned parameters can be directly collected by corresponding sensors arranged in the torso of the robot or indirectly calculated. In one embodiment, the trajectory of the COM of the previous step is to correct the trajectory of the COM of the current step.

Figure 5:
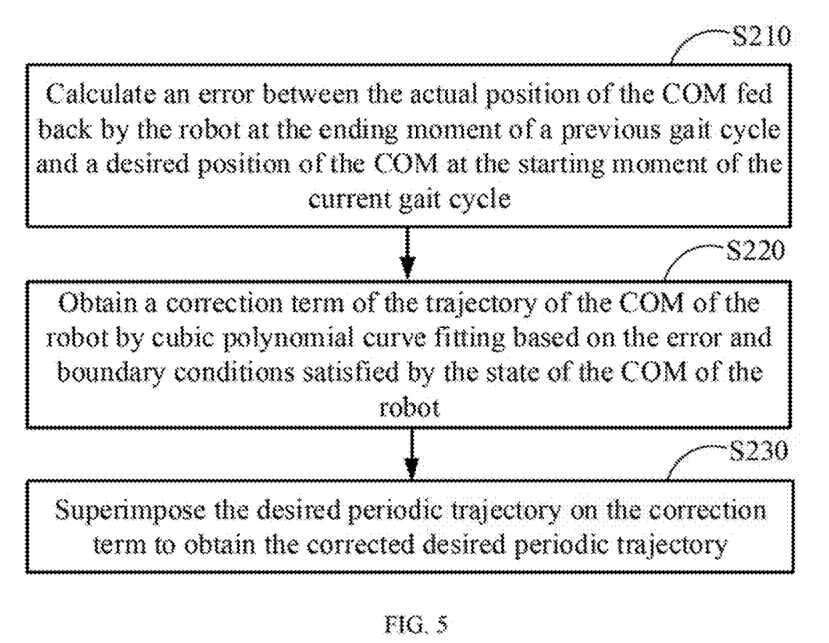
FIG. 5 is an exemplary flowchart of a method for correcting the desired periodic trajectory according to one embodiment.

Referring to FIG. 5, in one embodiment, step S120 may include the following steps.

Step S210: Calculate an error between the actual position of the COM fed back by the robot at the ending moment of a previous gait cycle and a desired position of the COM at the starting moment of the current gait cycle.

Figure 6:
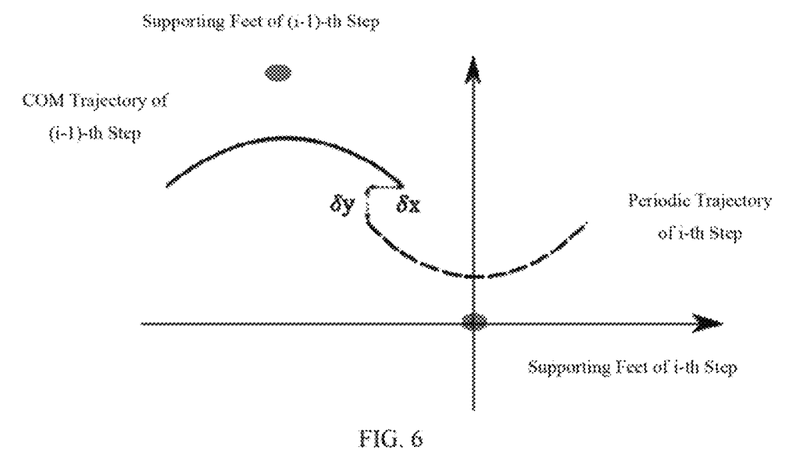
FIG. 6 is a schematic diagram of showing existence the error between the center-of-mass planning of the robot and the periodic trajectory.

As shown in FIG. 6, in the coordinate system established based on the position of the supporting leg in the i-th step, the periodic trajectory of the i-th step (i.e., the above-mentioned desired periodic trajectory) in an ideal state can be calculated through the above-mentioned dynamic equation. However, when there is interference, at the starting moment of the gait cycle, there will be a position error between the trajectory of the COM of the (i−1)-th step at the ending moment and the trajectory of the COM of the i-th step at the starting moment. The position error is denoted by [δx, δy], where δx and δy are the errors of the position of the COM along the forward and lateral directions, respectively.

Step S220: Obtain a correction term of the trajectory of the COM of the robot by cubic polynomial curve fitting based on the error and boundary conditions satisfied by the state of the COM of the robot.

In one embodiment, the boundary conditions satisfied by the state of the COM of the robot may include: in the single gait cycle, correction amounts of the position of the COM at the starting moment and the ending moment are respectively the error and zero, and correction amounts of the speed of the COM at the starting moment and the ending moment are both zero. The boundary conditions can be expressed as follows: $f_x(0) = \delta x$, $f_x(T) = 0$, $\dot{f}_x(0) = 0$, $\dot{f}_x(T) = 0$; $f_y(0) = \delta_y$, $f_y(T) = 0$, $\dot{f}_y(0) = 0$, $\dot{f}_y(T) = 0$, where T represents gait cycle, $f_x(0)$ and $\dot{f}_x(0)$ represent the correction amounts of the position and speed of the COM along the forward direction at the starting moment, $f_x(T)$ and $\dot{f}_x(T)$ represent the correction amounts of the position and speed of the COM along the forward direction at the ending moment, $f_y(0)$ and $\dot{f}_y(0)$ represent the correction amounts of the position and speed of the COM along the lateral direction at the starting moment, and $f_y(T)$ and $\dot{f}_y(T)$ represent the correction amounts of the position and speed of the COM along the lateral direction at the ending moment. It should be noted that the boundary conditions are only an example, for example, boundary conditions such as constraints on the acceleration of the COM may also be added, which are not limited here.

The trajectory of the COM of the robot is compensated respectively through the cubic polynomial curve satisfying the boundary conditions, that is, the above-mentioned desired periodic trajectory is corrected. It can be understood that by using a cubic polynomial to correct the calculated periodic trajectory, the smooth movement of the COM when the supporting legs are alternating can be guaranteed. For example, the cubic curve used for fitting may include, but not limited to, a cubic general polynomial curve, a cubic S-curve, a cubic sample curve, etc. The cubic sample curve may be a cubic Hermite curve or a cubic Bezier curve, etc., which are not limited here.

Taking the above-mentioned boundary conditions satisfied by the position and speed of the COM in a single gait cycle as an example, the following polynomial expression can be obtained using a general cubic polynomial curve:

$$f_x(t) = \frac{2\delta x}{T^3}t^3 - \frac{3\delta x}{T^2}t^2 + \delta x;$$

$$f_y(t) = \frac{2\delta y}{T^3}t^3 - \frac{3\delta y}{T^2}t^2 + \delta y, \text{ where } f_x(t) \text{ and } f_y(t)$$

represent the components of the correction term of the desired periodic trajectory in the forward direction and lateral direction, respectively.

Step S230: Superimpose the desired periodic trajectory on the correction term to obtain the corrected desired periodic trajectory.

Exemplarily, after the correction term is obtained, the calculated desired periodic trajectory can be added to the correction term, so as to obtain the final periodic trajectory. Taking the above-mentioned polynomial expression as an example, the expression of the corrected desired periodic trajectory is as follows:

$$x^d(t) = -\frac{S}{2}\cosh(\omega t) + \frac{\dot{x}_0}{\omega}\sinh(\omega t) + f_x(t);$$

$$y^d(t) = \frac{D}{2}\cosh(\omega t) + \frac{\dot{y}_0}{\omega}\sinh(\omega t) + f_y(t),$$

where $x^d(t)$ and $y^d(t)$ represent the desired trajectory of the COM of the robot along the forward and lateral directions.

Step S130: Generate a desired trajectory of the COM of the robot using the corrected desired periodic trajectory.

Figure 7:
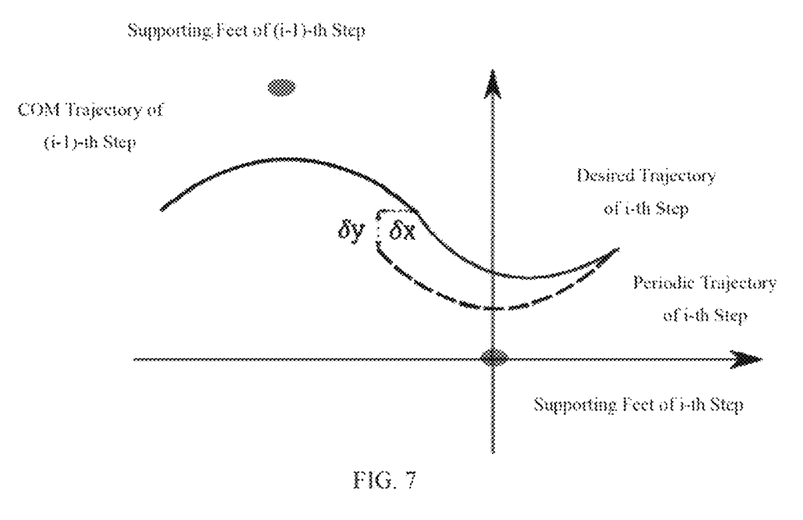
FIG. 7 is a schematic diagram of the desired center-of-mass planning obtained after compensating the periodic trajectory.

Exemplarily, the compensated periodic trajectories of each gait cycle can be combined to be the planned desired trajectory of the COM. As shown in FIG. 7, for the i-th step, after calculating the desired periodic trajectory of the i-th step and the correction item of the i-th step, the corrected desired periodic trajectory can be used as the desired trajectory of the COM of the i-th step. For each gait cycle, the desired trajectory of the COM of the corresponding step is determined in this way, thereby obtaining the entire desired trajectory of the COM of the robot.

Step S140: Control motion of the robot according to the desired trajectory of the COM of the robot.

Exemplarily, after the final trajectory of the COM is determined, the control variables of each joint of the robot, such as joint angles and joint angular velocities, can be solved through inverse kinematics equations. Then the calculated joint control amounts are sent to the corresponding joint motors to drive the motors to rotate, so that the robot can walk according to the desired trajectory of the COM to perform the desired task.

Optionally, considering that the robot may need to temporarily perform new tasks during the motion, the trajectory of the COM of the robot needs to be adjusted accordingly. In this regard, in one embodiment, the desired periodic trajectory calculated based on the dynamic equation can be corrected in real time according to the task requirements received in real time, and then the trajectory of the COM can be adjusted in real time without re-planning the entire trajectory of the COM, which is fast and easy.

Referring to FIG. 8, in one embodiment, when correcting the desired periodic trajectory, the method may include the following steps.

Step S121: Correct the desired periodic trajectory according to the fed-back state of the COM of the robot and task requirements received in real time to obtain the corrected desired periodic trajectory.

For example, the task requirements may include, but not limited to, performing follow-up operations and the like. In one embodiment, when planning the trajectory of the COM in real time, in addition to the interference of the robot itself, it also takes into account the temporary reception of new tasks, which can improve the response efficiency of the robot to perform new tasks. Exemplarily, the corresponding error can be calculated through the feedback of the state of the COM of the robot. Then, a total correction term can be calculated based on the boundary conditions formed by this error and the requirements of the task to be performed, and the periodic trajectory is then corrected using the total correction term.

In the COM motion planning method above, the walking process is divided into multiple individual gait cycles. Based on the dynamic equation constructed based on the simplified linear inverted pendulum model of the robot, the periodic trajectory planning is carried out for each gait cycle, and then multiple periodic trajectories are combined to form the trajectory of the COM of the robot. This is simpler and faster than the conventional COM planning method, and the trajectory of the COM of the robot can be corrected in real time according to new task requirements. The cubic curve can be used to correct the calculated periodic trajectory, which can allow for the smooth movement of the COM when the support feet are alternating.

It should be understood that sequence numbers of the foregoing processes do not mean particular execution sequences. The execution sequences of die processes should be determined based on functions and internal logic of the processes, and should not be construed as any limitation on the implementation processes of the embodiments of the present disclosure.

Referring to FIG. 9, in one embodiment, a COM motion planning device 100 may include a periodic trajectory solving module 10, a trajectory correction module 20, a trajectory generation module 30, and a motion control module 40. The periodic trajectory solving module 10 is to calculate a desired periodic trajectory of the robot in a single gait cycle based on a dynamic equation constructed according to a simplified model of the robot. The dynamic equation is constructed by simplifying the robot into a linear inverted pendulum model, with a zero moment point of the robot consistent with a support point of the linear inverted pendulum model. The trajectory correction module 20 is to correct the desired periodic trajectory according to a fed-back state of the COM of the robot. The trajectory generation module 30 is to generate a desired trajectory of the COM of the robot using the corrected desired periodic trajectory. The motion control module 40 is to control motion of the robot according to the desired trajectory of the COM of the robot.

In one embodiment, the trajectory correction module 20 may include an error calculation submodule, a curve fitting submodule and a correction superposition submodule. The error calculation submodule is to calculate an error between the actual position of the COM fed back by the robot at an ending moment of a previous gait cycle and a desired position of the COM at a starting moment of a current gait cycle. The curve fitting submodule is to obtain a correction term of the trajectory of the COM of the robot by cubic polynomial curve fitting based on the error and boundary conditions satisfied by the state of the COM of the robot. The correction superposition submodule is to superimpose the desired periodic trajectory on the correction term to obtain the corrected desired periodic trajectory.

In one embodiment, the trajectory correction module 20 is further to correct the desired periodic trajectory according to the fed-back state of the COM of the robot and task requirements received in real time to obtain the corrected desired periodic trajectory.

It can be understood that the device in the embodiments above corresponds to the method in the embodiments above. The basic principles and technical effects of the device are the same as the aforementioned method. For a brief description, for parts not mentioned in this device embodiment, reference can be made to corresponding description in the method embodiments.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for controlling a robot based on a trajectory of a center of mass (COM) of the robot, the method comprising:
calculating a desired periodic trajectory of the robot in a single gait cycle based on a dynamic equation constructed according to a simplified model of the robot;
correcting the desired periodic trajectory according to a fed-back state of the COM of the robot;
generating a desired trajectory of the COM of the robot using the corrected desired periodic trajectory; and
controlling motion of the robot according to the desired trajectory of the COM of the robot;
wherein the state of the COM of the robot comprises an actual position of the COM, correcting the desired periodic trajectory according to the fed-back state of the COM of the robot comprises:
calculating an error between the actual position of the COM fed back by the robot at an ending moment of a previous gait cycle and a desired position of the COM at a starting moment of a current gait cycle;
obtaining a correction term of the trajectory of the COM of the robot by cubic polynomial curve fitting based on the error and boundary conditions satisfied by the state of the COM of the robot; and
superimposing the desired periodic trajectory on the correction term to obtain the corrected desired periodic trajectory.

2. The method of claim 1, wherein the dynamic equation is constructed by simplifying the robot into a linear inverted pendulum model, with a zero moment point of the robot consistent with a support point of the linear inverted pendulum model.

3. The method of claim 2, wherein the dynamic equation is expressed as follows: $\ddot{x}=\omega^2 x$, $\ddot{y}=\omega^2 y$, where $\omega=\sqrt{g/z}$, x and $\ddot{x}$ are respectively a position of the COM and an acceleration of the COM of the linear inverted pendulum model in a forward direction, y and $\ddot{y}$ are respectively a position of the COM and an acceleration of the COM of the linear inverted pendulum model in a lateral direction, z is a height of the COM of the linear inverted pendulum model from a supporting surface, and g is acceleration of gravity.

4. The method of claim 3, wherein the desired trajectory of the COM of the robot is expressed as follows:

$$x^d(t) = -\frac{S}{2}\cosh(\omega t) + \frac{\dot{x}_0}{\omega}\sinh(\omega t) + f_x(t),$$

$$y^d(t) = \frac{D}{2}\cosh(\omega t) + \frac{\dot{y}_0}{\omega}\sinh(\omega t) + f_y(t),$$

represent the desired trajectories of the COM of the robot in the forward direction and the lateral direction, cos h( ) and sin h( ) represent hyperbolic cosine and sine respectively, S and D represent a step length and a step width of the robot, $\dot{x}_0$ and $\dot{y}_0$ represent speeds of the COM of the robot in the forward direction and the lateral direction at a starting moment of one gait cycle, respectively, $f_x(t)$ and $f_y(t)$ represent components of a correction term of the desired periodic trajectory in the forward direction and the lateral direction, respectively.

5. The method of claim 1, wherein the boundary conditions satisfied by the state of the COM of the robot comprise: in the single gait cycle, correction amounts of the position of the COM at the starting moment and the ending moment are respectively the error and zero, and correction amounts of a speed of the COM at the starting moment and the ending moment are both zero.

6. The method of claim 1, further comprising: correcting the desired periodic trajectory according to the fed-back state of the COM of the robot and task requirements received in real time to obtain the corrected desired periodic trajectory.

7. A biped robot comprising:
one or more processors; and
a memory coupled to the one or more processors, the memory storing programs that, when executed by the one or more processors of the robot, cause performance of operations comprising:
calculating a desired periodic trajectory of the robot in a single gait cycle based on a dynamic equation constructed according to a simplified model of the robot;
correcting the desired periodic trajectory according to a fed-back state of a center of mass (COM) of the robot;
generating a desired trajectory of the COM of the robot using the corrected desired periodic trajectory; and
controlling motion of the robot according to the desired trajectory of the COM of the robot;
wherein the state of the COM of the robot comprises an actual position of the COM, correcting the desired periodic trajectory according to the fed-back state of the COM of the robot comprises:
calculating an error between the actual position of the COM fed back by the robot at an ending moment of a previous gait cycle and a desired position of the COM at a starting moment of a current gait cycle;
obtaining a correction term of the trajectory of the COM of the robot by cubic polynomial curve fitting based on the error and boundary conditions satisfied by the state of the COM of the robot; and
superimposing the desired periodic trajectory on the correction term to obtain the corrected desired periodic trajectory.

8. The biped robot of claim 7, wherein the dynamic equation is constructed by simplifying the robot into a linear inverted pendulum model, with a zero moment point of the robot consistent with a support point of the linear inverted pendulum model.

9. The biped robot of claim 8, wherein the dynamic equation is expressed as follows: $\ddot{x}=\omega^2 x$, $\ddot{y}=\omega^2 y$, where $\omega=\sqrt{g/z}$, x and $\ddot{x}$ are respectively a position of the COM and an acceleration of the COM of the linear inverted pendulum model in a forward direction, y and $\ddot{y}$ are respectively a position of the COM and an acceleration of the COM of the linear inverted pendulum model in a lateral direction, z is a height of the COM of the linear inverted pendulum model from a supporting surface, and g is acceleration of gravity.

10. The biped robot of claim 9, wherein the desired trajectory of the COM of the robot is expressed as follows:

$$x^d(t) = -\frac{S}{2}\cosh(\omega t) + \frac{\dot{x}_0}{\omega}\sinh(\omega t) + f_x(t),$$

$$y^d(t) = \frac{D}{2}\cosh(\omega t) + \frac{\dot{y}_0}{\omega}\sinh(\omega t) + f_y(t),$$

represent the desired trajectories of the COM of the robot in the forward direction and the lateral direction, cos h( ) and sin h( ) represent hyperbolic cosine and sine respectively, S and D represent a step length and a step width of the robot, $\dot{x}_0$ and $\dot{y}_0$ represent speeds of the COM of the robot in the forward direction and the lateral direction at a starting moment of one gait cycle, respectively, $f_x(t)$ and $f_y(t)$ represent components of a correction term of the desired periodic trajectory in the forward direction and the lateral direction, respectively.

11. The biped robot of claim 7, wherein the boundary conditions satisfied by the state of the COM of the robot comprise: in the single gait cycle, correction amounts of the position of the COM at the starting moment and the ending moment are respectively the error and zero, and correction amounts of a speed of the COM at the starting moment and the ending moment are both zero.

12. The biped robot of claim 7, wherein the operations comprise: correcting the desired periodic trajectory according to the fed-back state of the COM of the robot and task requirements received in real time to obtain the corrected desired periodic trajectory.

13. A non-transitory computer-readable storage medium storing instructions that, when executed by at least one processor of a robot, cause the at least one processor to perform a method, the method comprising:
calculating a desired periodic trajectory of the robot in a single gait cycle based on a dynamic equation constructed according to a simplified model of the robot;
correcting the desired periodic trajectory according to a fed-back state of a center of mass (COM) of the robot;
generating a desired trajectory of the COM of the robot using the corrected desired periodic trajectory; and
controlling motion of the robot according to the desired trajectory of the COM of the robot;
wherein the state of the COM of the robot comprises an actual position of the COM, correcting the desired periodic trajectory according to the fed-back state of the COM of the robot comprises:
calculating an error between the actual position of the COM fed back by the robot at an ending moment of a previous gait cycle and a desired position of the COM at a starting moment of a current gait cycle;
obtaining a correction term of the trajectory of the COM of the robot by cubic polynomial curve fitting based on the error and boundary conditions satisfied by the state of the COM of the robot; and
superimposing the desired periodic trajectory on the correction term to obtain the corrected desired periodic trajectory.

14. The non-transitory computer-readable storage medium of claim 13, wherein the dynamic equation is constructed by simplifying the robot into a linear inverted pendulum model, with a zero moment point of the robot consistent with a support point of the linear inverted pendulum model.

15. The non-transitory computer-readable storage medium of claim 14, wherein the dynamic equation is expressed as follows: $\ddot{x}=\omega^2 x$, $\ddot{y}=\omega^2 y$, where $\omega=\sqrt{g/z}$, x and $\ddot{x}$ are respectively a position of the COM and an acceleration of the COM of the linear inverted pendulum model in a forward direction, y and $\ddot{y}$ are respectively a position of the COM and an acceleration of the COM of the linear inverted pendulum model in a lateral direction, z is a height of the COM of the linear inverted pendulum model from a supporting surface, and g is acceleration of gravity.

16. The non-transitory computer-readable storage medium of claim 15, wherein the desired trajectory of the COM of the robot is expressed as follows:

$$x^d(t) = -\frac{S}{2}\cosh(\omega t) + \frac{\dot{x}_0}{\omega}\sinh(\omega t) + f_x(t),$$

$$y^d(t) = \frac{D}{2}\cosh(\omega t) + \frac{\dot{y}_0}{\omega}\sinh(\omega t) + f_y(t),$$

represent the desired trajectories of the COM of the robot in the forward direction and the lateral direction, cos h( ) and sin h( ) represent hyperbolic cosine and sine respectively, S and D represent a step length and a step width of the robot, $\dot{x}_0$ and $\dot{y}_0$ represent speeds of the COM of the robot in the forward direction and the lateral direction at a starting moment of one gait cycle, respectively, $f_x(t)$ and $f_y(t)$ represent components of a correction term of the desired periodic trajectory in the forward direction and the lateral direction, respectively.

17. The non-transitory computer-readable storage medium of claim 13, wherein the boundary conditions satisfied by the state of the COM of the robot comprise: in the single gait cycle, correction amounts of the position of the COM at the starting moment and the ending moment are respectively the error and zero, and correction amounts of a speed of the COM at the starting moment and the ending moment are both zero.

18. The non-transitory computer-readable storage medium of claim 13, wherein the method further comprises: correcting the desired periodic trajectory according to the fed-back state of the COM of the robot and task requirements received in real time to obtain the corrected desired periodic trajectory.

19. The non-transitory computer-readable storage medium of claim 13, wherein the cubic polynomial curve comprises: a cubic general polynomial curve, a cubic S-curve, and a cubic sample curve.

20. The non-transitory computer-readable storage medium of claim 19, wherein the cubic sample curve is a cubic Hermite curve or a cubic Bezier curve.

* * * * *